United States Patent Office 3,111,411
Patented Nov. 19, 1963

3,111,411
METHOD OF FORMING DECORATIVE PARTICLES FOR INCORPORATION INTO FOOD AND PROCESS OF MANUFACTURE THEREOF
Gideon E. Livingston, Rye, N.Y., assignor to Continental Baking Company, Rye, N.Y., a corporation of New York
No Drawing. Filed Apr. 7, 1961, Ser. No. 101,341
3 Claims. (Cl. 99—148)

The present invention relates to compositions of matter of variegated color, size and shape which are capable of retaining their integrity when incorporated into food products; to food products containing such compositions of matter; and to methods of making such compositions as well as food products containing such compositions.

It is well known that in non-food products such as plastics or paints, it is feasible to retain the integrity of colored particles introduced into a medium of another color, simply by insuring that the vehicle of which the material for the particles is made, is insoluble in or incompatible with the primary medium. This leads, for example, to the creation of so-called "spatter effects." It would be desirable to achieve "spatter" or "confetti" effects in food products, but, with a few exceptions, it has not proven feasible to do so. The reason for this failure resides in the fact that most food products are readily compatible with one another, inasmuch as they generally contain water as a component. Where water is not present, i.e., fat or oil base products, a specific gravity differential exists and consequently physical separation is apt to occur when objects capable of giving a "spatter effect" are introduced into such foods. Exceptions referred to above are products, such as prepared cheese spreads, where naturally colored foods, such as pimiento particles, or chive particles, are incorporated into the cheese base.

It is an object of the present invention to provide novel edible objects or compositions of matter to be added to food products for the purpose of decorating them or rendering them more nutritive, or both.

Another object of this invention is to provide a novel process for the manufacture of edible objects or compositions of matter which may be incorporated into food materials, the edible objects comprising ingredients generally recognized as safe by food experts or enjoying governmental sanction.

Still another object of this invention is to provide decorative particles for creating new effects in foods, such particles serving not only as a decoration to increase the esthetic appeal of the food product, but also as conveyors of flavor, nutrients, and the like.

A further object of this invention is to provide colored particles for incorporation into foodstuffs which will retain their color without bleeding, and which will be of controllable firmness and texture ranging from hard and chewy to a very soft plastic texture.

Other objects and advantages of the invention will in part be obvious and will in part become apparent from the following description.

According to the present invention, edible particles of variegated color, shape and sizes are produced by extruding a thixotropic semi-gel of a hydrophilic colloid comprising certain dyestuffs into solutions of metallic ions capable of transforming the semi-gel into an advanced, firm gel. The resulting advanced gel may then be cut or comminuted into particles of desirable size and shape for incorporation into foodstuffs.

By hydrophilic colloids is meant any edible natural or synthetic gel-forming material, such as gums, proteins, cellulose ethers, and the like, which can be converted, as by the action of aqueous solutions containing cations, e.g., calcium, aluminum and magnesium cations, from a thixotropic semi-gel to a firm, advanced gel resistant to higher temperatures, and to water, oils or fats which commonly from the fundamental ingredients in food stuffs of the type described herein. As examples of natural hydrophillic colloids may be mentioned pectin, algin, casein, and the like; as examples of synthetic hydrophilic colloids may be mentioned methyl cellulose, carboxy methyl cellulose, hydroxy methyl cellulose, and the like. Such hydrophilic colloids, or mixtures of such hydrophilic colloids, may be used to produce the edible decorative and/or nutritional compositions of matter described herein.

Of the hydrophilic colloids mentioned, the carbohydrate hydrophilic colloids are preferred. Of these pectin, and more particularly, low methoxyl pectin, e.g. pectin having less than about 7 weight percent methoxyl, has been found to be particularly suitable. Especially good results are also achieved with the algin. Semi-gels of these carbohydrate hydrophilic colloid materials have the ability to rapidly form firm, advanced gels in the presence of various edible metallic ions, such as calcium, aluminum and magnesium ions.

The dyestuffs suitable for use in the present invention may be described as lakes of water-soluble coal tar dyes, certified for use by the Pure Food and Drug Administration. Such lakes are prepared by freshly precipitating metallic hydroxides in the presence of the dyes. The precipitate is a highly colored compound of the metallic hydroxide and the organic material. In preparing lakes, the hydroxides of aluminum, iron, chromium and tin may be used. Suitable for use in this invention are the aluminum lakes of edible, water-soluble coal tar dyes.

Typical of the dyes which may be used to form the aluminum lakes described herein are: FD & C Blue #1 (Brilliant Blue FCF-disodium salt of dibenzyldiethyldiaminotriphenylcarbinol trisulfonic acid anhydride); FD & C Blue #2 (Indigotine-disodium salt of 5,5'-indigotindisulfonic acid); FD & C Green #1 (Guinea Green B-monosodium salt of dibenzyldiethyldiaminotriphenylcarbinol disulfonic acid anhydride); FD & C Red #2 (Amaranthtrisodium salt of 1-(4-sulfo-1-napthylazo)-2-naphthol-3,6-disulfonic acid); FD & C Red #3 (Erythrosine-disodium salt of 9-o-carboxyphenyl-6-hydroxy-2,4,5,7-tetraido-3-isoxanthone); FD & C Red #4 (Ponceau SX-sodium salt of 2-(5-sulfo-2,4-xylylazo)-1-naphthol-4-sulfonic acid); FD & C Yellow #5 (Tartrazinetrisodium salt of 3-carboxy-5-hydroxy-1-sulfophenyl-4-p-sulfophenylazopyrazole); FD & C Yellow #6 (Sunset Yellow FCF-disodium salt of 1-sulfophenylazo-2-napthol-6-sulfonic acid); and FD & C Violet #1 (Acid Violet 6B-monosodium salt of 4-([4-(N-ethyl-p-sulfobenzylamino) - phenyl] - [4-(N-ethyl-p-sulfoniumbenzylamino) - phenyl] - methylene)-(N,N-dimethyl-$\Delta^{2,3}$-cyclohexadienimine).

In forming the edible compositions of matter described herein, a semi-gel of the hydrophilic colloid is prepared, as by the addition of water and sugar, e.g., sucrose, and aluminum lakes of the water-soluble coal tar dyes added as coloring. The lakes may be mixed with any of the ingredients making up the semi-gel, as for example water and/or sugar, or may be added to the semi-gel after its formation. It is a key concept in this invention that the aluminum of the lake reacts with the hydrophilic colloid material to form a complexing bond. The nature of this bond is unknown, although it may be speculated that either neutralization of particle charges or co-precipitation is involved. The effect of this interaction is the production of a colored system in which the aluminum of the lake complexes the water-soluble coal tar dye on the one hand, and the components of the gel on the other hand, thus insuring a remarkable degree of freedom from color leaching or "bleeding." Since aluminum lakes of edible, water-soluble coal tar dyes have a wide variety of colors, it is possible to produce colored particles of almost any desired hue or shade.

The quantity of the aluminum lakes added to the hydrophilic colloid gels is quite small. The amount of dyestuff, based on the weight of hydrophilic colloid in the semi-gel, however, should be at least about 0.05%, and preferably at least about 0.1%, or between about 0.1 and 20%, and preferably between about 0.1 and 10%.

In preparing the semi-gels of the hydrophilic colloids suitable quantities of water and any of the mono- and disaccharides are added to the hydrophilic colloid to produce a semi-gel. The resulting semi-gel may be shaped by any conventional means, or by molding or extrusion, and exposed to the aqueous solution of the cations described herein. The cations transform the shaped particles of the semi-gel into particles of firm, advanced gel. Following solidification, the particles may be dried and stored for subsequent use in foodstuffs. In use, the particles may be added in their firm, solid state or may be suitably softened by treatment with water prior to their introduction into foodstuffs.

In addition to coloring, there may also be added to the semi-gel any suitable flavoring, fruit acids, spice extractives, nutrients, such as vitamins, and the like. Care should be exercised to insure that such additional ingredients do not themselves set the hydrophilic colloids, or prevent transformation to an advanced gel when the semi-gel is subjected to the firming solution.

The gelling solution of the present invention will depend upon the particular hydrophilic colloid employed. With this in mind, such solutions comprising water-soluble salts of calcium, magnesium and aluminum may be used.

Both organic and inorganic salts of these metals may be used. Typical of these may be mentioned the halides, nitrates, hydrogen phosphates, acetates, lactates, citrates, and so forth. Other well known water-soluble salts of these metals will readily suggest themselves to those skilled in the art. The concentration of the salts in the baths may vary over wide limits. In general, the higher the concentration of the metallic ions in the bath, the more quickly will the solidification and setting of the semi-gels take place. Care however, should be exercised in preparing the baths to insure that the concentration of the salts in the bath is not high enough to decompose the lakes. In general, baths containing between about 0.05 and 10% and preferably between about 0.1 and 5% by weight of dissolved cations will be satisfactory.

Of the salts, the calcium salts have been found to form insoluble calcium salts with all of the hydrophilic colloids described herein. The aluminum and magnesium salts may be used with those hydrophilic colloids which form insoluble magnesium and aluminum salts with the aluminum and magnesium ions. Thus, for example, magnesium salts may be used with pectins, but cannot be used with the algin. The aluminum salts, on the other hand, may be used with both pectin and algin.

An alternative method of bringing about the transformation of the thixotropic semi-gel is to incorporate into the semi-gel water insoluble organic and inorganic salts of calcium, magnesium and aluminum. Among these salts may be mentioned the carbonates, phosphates, and the like. Other suitable water-insoluble salts will readily suggest themselves to one skilled in the art, as for example, by reference to Lange's Handbook of Chemistry. The resulting semi-gel may then be extruded into an acid bath or spray containing a suitable edible acid which will dissolve the insoluble salt to release the cation to thereby bring about rapid conversion of semi-gel to the advanced gel stage.

Also, if desired, the insoluble salts mentioned hereinabove may be mixed with the semi-gel, a suitable edible acid added thereto solubilize the salt and release the cations, to thereby bring about transformation to the advanced gel stage. The resulting solidified gel may then be comminuted into particles of suitable size for incorporation into the foodstuffs described herein.

Applications for these colored particles in food products include decoration of cake or cupcake icings, decorating the crumb of bread loaves or cakes, decorating spreads, confectionery products, salad spreads, ice cream and frozen desserts, chip dips, cheese products, infant foods, syrups, soda fountain preparations and medicinals.

For the purpose of giving those skilled in the art a better understanding of the invention and/or a better appreciation of the advantages of the invention, the following illustrative examples are given. Although illustrative, the examples are not intended to limit the scope of the invention, except as such limitations may appear in the claims.

*Example 1*

Ten grams of low methoxy pectin having less than 7% methoxyl content, and 50 grams of commercial, granulated sugar, e.g., sucrose, are dry blended until a homogenous mixture is formed. Fifty milliliters of water are then added, and a slurry made. Fifty milliliters of additional water are added and the resulting mixture is thoroughly mixed until all of the ingredients are dissolved. One gram of the aluminum lake of tartrazine is added to the resulting mixture, followed by agitation until a soft semi-gel forms. The gel is extruded into a saturated solution of calcium hydrogen phosphate, using a baker's icing decorator as the extruding device. Strands of the gel are removed from the gelling solution after five seconds, rinsed in cold water for one minute with agitation, and spread out to air-dry at room temperature overnight. The dried strings are ground to a small particle size (maximum length about 2 millimeters) using a Waring Blendor. The resulting particles are incorporated into a cup cake icing and well mixed. The icing is applied to cakes and cup cakes and shows no bleeding of the particle colors. The particles are also sprinkled on cup cake icings which are subsequently packaged and held for a week. No color bleeding occurs during this period of time.

*Example 2*

Ten grams of the low methoxy pectin described in Example 1 and 50 grams of sugar are thoroughly dry blended. Fifty milliliters of additional water are added and the resulting admixture thoroughly agitated until a soft semi-gel forms. The resulting semi-gel is divided into two equal portions and 0.5 grams each of aluminum lake of Tartrazine and Sunset Yellow added to each portion respectively, and the resulting composites are well mixed forming soft semi-gels. The semi-gels are processed in the manner described in Example 1. Strands are removed from the saturated solution of calcium hydrogen phosphate after five seconds, hung to air dry for half an hour, and cut manually with a knife into small particles. These particles can readily be handled and are incorporated into cup cake icings without difficulty and without bleeding of the colors.

*Example 3*

Example 1 is repeated with the exception that the following dyes are used:

Aluminum lake of FD & C Red #2
Aluminum lake of FD & C Yellow #6
Aluminum lake of FD & C Blue #2
Aluminum lake of FD & C Green #1
Aluminum lake of FD & C Violet #1

The finished particles are air dried overnight at a temperature of 70° F. to 75° F. After drying the particles are stored at room temperature for three weeks in order to determine their preservation capacity. At the end of three weeks, the particles are comminuted to produce variegated shaped particles. The different batches are then mixed to produce a multi-colored combination and the mixed particles are again stored for about three weeks at room temperature. At the end of this time, the particles are re-hydrated by immersion in water at about room temperature, i.e., 40° to 70° F. for about ½ hour. Upon removal from the water, the particles are found to have regained a soft gel characteristic. No loss of color integrity is noted.

*Example 4*

A solution is made containing 30 grams of low methoxy pectin having less than 7 percent methoxyl content, 70 grams of sucrose, 6 grams of ascorbic acid, 0.75 gram of citric acid, 2.5 grams of the aluminum lake of Amaranth and 300 milliliters of distilled water. The resulting semi-gel is extruded through a fine orifice into a saturated solution of calcium lactate. The flow of material through the orifice is interrupted continuously to form droplets which are, in turn, fed into the calcium lactate solution. The droplets are transformed in the solution into firm, advanced gel colored pellets. The resulting pellets are removed from the calcium lactate solution and dried. The dried pellets may be readily softened by immersion in water and are suitable for use in both the dried or the softened form. The color of the particles is stable, and even when immersed in water, no bleeding of the color occurs.

*Example 5*

Example 1 is repeated with the exception that algin is substituted for the pectin. Similar results are achieved.

*Example 6*

Example 1 is repeated with the exception that casein is substituted for pectin. Similar results are achieved.

The invention in its broader aspects is not limited to the specific details shown and described but departures may be made therefrom within the scope of the accompanying claims without departing from the principles of the invention and without sacrificing its chief advantages.

What is claimed is:

1. A method of preparing decorative compositions of matter which comprises preparing a semi-gel by reacting a hydrophilic colloid and a metallic lake of a water-soluble coal tar dye, and exposing the semi-gel to metallic ions capable of transforming the semi-gel to a solid, advanced gel.

2. A method of preparing decorative objects which comprises preparing a semi-gel by reacting a hydrophilic colloid and an aluminum lake of a water-soluble coal tar dye, extruding the gel into an aqueous solution comprising cations capable of transforming the semi-gel to an advanced, solid gel, and recovering the resulting gel from the aqueous solution upon solidification.

3. A method of forming decorative articles for incorporation into foodstuffs which comprises preparing a semi-gel comprising a hydrophilic colloid taken from the group consisting of pectin, algin, and mixtures of the foregoing, and an aluminum lake of a water-soluble coal tar dye, extruding the semi-gel into an aqueous solution comprising calcium ions to transform the semi-gel to a firm, advanced gel, and recovering the advanced gel from the water solution.

References Cited in the file of this patent
UNITED STATES PATENTS

| | | |
|---|---|---|
| 2,553,617 | Wendt | May 22, 1951 |
| 2,652,334 | Barch | Sept. 15, 1953 |
| 2,791,508 | Rivoche | May 7, 1957 |
| 2,861,891 | Bauernfeind | Nov. 25, 1958 |